Patented Sept. 8, 1931

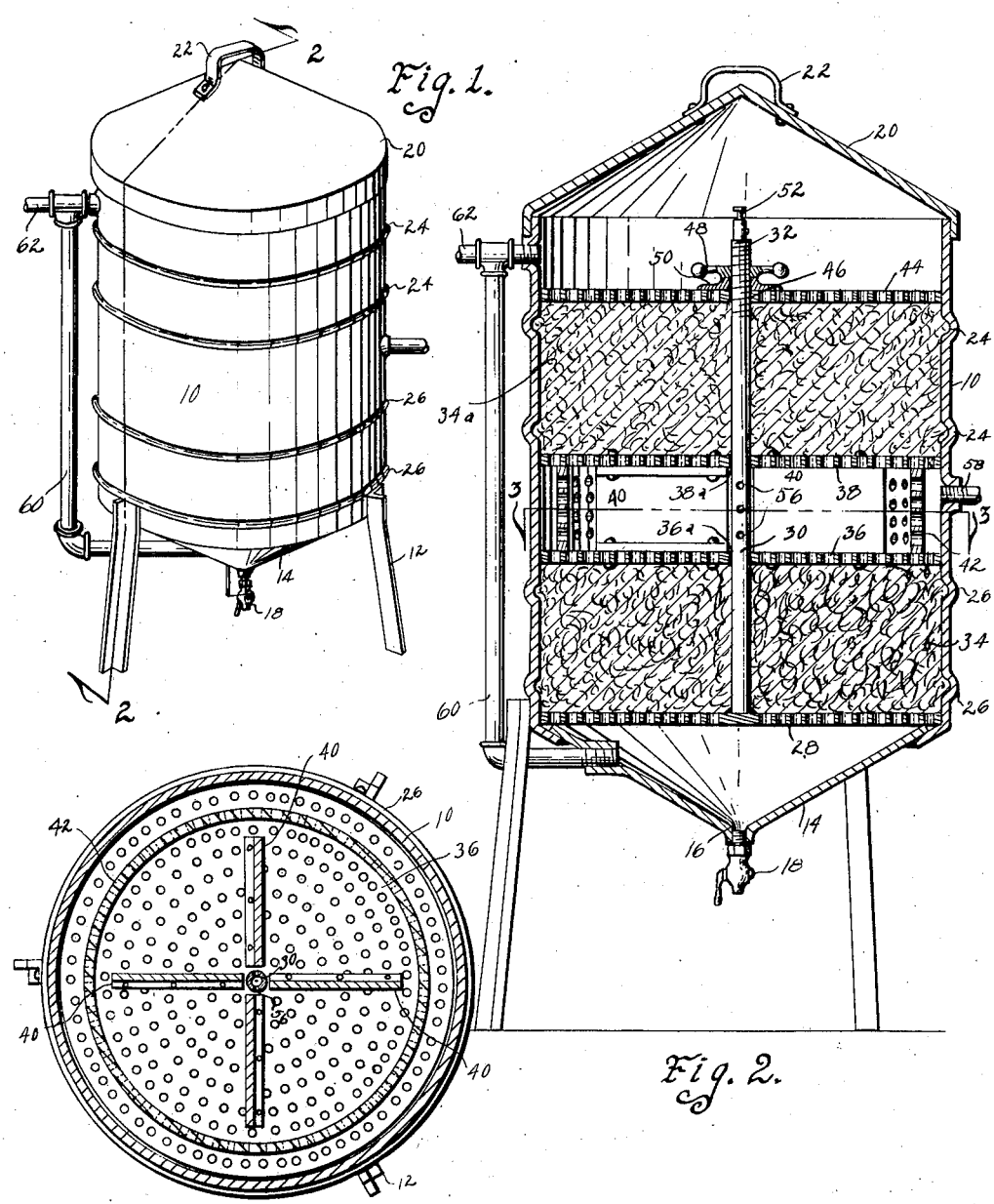

1,822,368

UNITED STATES PATENT OFFICE

EDGAR A. OHLSON, OF OGDEN, IOWA

LIQUID FILTER

Application filed September 16, 1929. Serial No. 392,956.

The object of my invention is to provide a liquid filter of very simple, durable and inexpensive construction.

More particularly, it is the purpose of my invention to provide a liquid filter occupying a minimum of space and of such structure as to have a minimum resistance to the path of the material to be filtered through the filtering material.

Another purpose is to provide a liquid filter of such structure that a maximum of material can be filtered through filtering material occupying a minimum of space.

Still another purpose is to provide a filtering structure which can be conveniently drained without drawing off accumulated dirt and muck.

Another purpose is to provide such a filter having structure providing a positive seal against the passage of moisture and other impurities.

Still another purpose is to provide in such a filter convenient means for permitting the venting of air which may gather in the filter.

Still another purpose is to provide such a filter of such structure and arrangement of parts as to permit the ready and easy installation and removal of parts for taking out and replacing filtering material and for cleaning the filter.

With these and other objects in view, my invention consists in the construction, arrangement and combination of the various parts of my liquid filter, whereby the objects contemplated are attained, as hereinafter more fully set forth, pointed out in my claims, and illustrated in the accompanying drawings, in which:

Figure 1 is a perspective view of a liquid filter embodying my invention.

Figure 2 is a vertical, detail, sectional view taken on the line 2—2 of Figure 1; and Figure 3 is a horizontal, sectional view taken on the line 3—3 of Figure 2.

My improved liquid filter includes a tubular member preferably in cylindrical form, such as that shown at 10 in the drawings. This member 10 forms a container for the filtering material, filtering material holders and other parts hereinafter to be mentioned.

Preferably the container 10 is supported on legs 12.

I prefer to provide the container 10 with a bottom 14 having the form of an inverted cone, provided with an outlet 16 at its lowermost point controlled by a suitable cock 18. Likewise the container 10 is provided with a removable top 20 in the form of a hollow cone, having a handle 22.

The container 10 has in its upper portion one or more annular interior grooves 24 and in its lower portion similar grooves 26, which completely encircle the container wall. The legs 12 are welded to the container below the lower groove 26.

I shall now describe the means for holding the filtering material in the container 10. Such means are inserted into the top of the container after the removal of the cover 20.

I provide a lower filter holder 28, which is in the form of a foraminous disc adapted to rest at the upper part of the bottom 14, as shown best in Figure 2. This disc is of sufficient strength and rigidity to properly support a central, upwardly extending tubular post 30, which is externally screw-threaded as at 32 at its upper end.

The filter material holder disc 28 may be freely slipped into or out of the container 10.

In assembling the parts for actual use, a lower body of filtering material 34 is placed on the disc 28.

I then insert from above a pair of spaced connected filtering material holder discs 36 and 38, which are connected together in vertically spaced relation by a plurality of radially extending walls 40. The walls 40 terminate short of the peripheries of the discs 36 and 38 and also terminate short of the centers of said discs, as illustrated in Figure 3.

It will, of course, be understood that the discs 36 and 38 are provided with suitable openings 36a and 38a to snugly receive the upright tubular post 30, as shown in Figures 2 and 3.

An annular perforated band 42 is arranged between the discs 36 and 38 and spaced outwardly from the outer ends of the walls 40.

The parts are so arranged that the band 42 is frictionally held in place.

Next I place above the disc 38 a second body of filtering material 34a. Above the body of material 34a is placed a disc 44 having a central opening 46 to receive the upright tubular post 30.

For properly tightening the parts and packing the filtering material 34 and 34a, I screw a nut 48 on the upper end of the post 30 to bear against a lug 50 on the upper surface of the disc 44. The lower end of the upright post 30 is closed. The upper end is controlled by means of a suitable manually adjustable cock 52.

In the intermediate portion of the upright post 30 between the discs 36 and 38 when the device is completely assembled is a plurality of air vent holes 56. An inlet tube 58 leads through the wall of the container 10 into the space which is between the discs 36 and 38 as shown in Figure 2. An outlet tube 60 emerges from the bottom 14 below the disc 28 and connects with an outlet tube 62 emerging from the upper part of the container 10 above the disc 44.

A little experience will show about the proper amount of filtering material 34 and 34a, which should be placed in the device, so that when the filtering material is compressed, the parts will be in proper relative positions.

A filtering device of this kind can be used for a great many purposes. When used for instance with a solvent in cleaning dirty gasoline of the kind used in the so-called French dry-cleaning plants, the user pours into the container a quantity of solvent. There are several of these solvents now on the market. A caustic soda solution may be used.

The material to be filtered, such for instance as dirty gasoline, is supplied to the filter through the inlet pipe 58. The perforated annular member 42 serves to cause the gasoline to flow around the container and to have an even flow into the space inside the member 42.

Thence the gasoline flows upwardly and downwardly through the two bodies of filtering material to the respective outlets.

A structure of this kind has a number of important advantages.

By supplying the material to be filtered to the middle of the container and permitting it to flow upwardly and downwardly through the filtering material, back pressure is reduced to a minimum.

Putting it another way, only a minimum amount of pressure is required for passing the material to be filtered through the filter. This makes for economy in pump operation.

A given amount of material to be filtered can be passed through the filter at a minimum speed, thus securing the maximum effect of the solvent used and the maximum filtering effect of the filtering material 34 and 34a.

There is a tendency for filtering material to "channel" adjacent the wall of the container and then some of the material to be filtered is likely to pass upwardly or downwardly through the filter without being properly filtered. This is avoided with my structure because the filtering material packs into the grooves 24 and 26, and the path of any such material tending to pass in a channel is broken.

A very important feature of a filter of this kind is found in the ease with which it may be disassembled for cleaning. When it is desired to clean out the filter and to put in new filtering material, the top member 20 is removed, the nut 48 is screwed off, and the disc 44 is lifted out by means of a suitable tube. The filtering material 34a can then be removed. Then it is possible to remove the unit including the discs 38 and 36 and the parts between them, sliding them up the post 30. The lower body of filtering material 34 can then be taken out, or if it is desired the entire post, filtering material 34 and disc 38 may be lifted out and the filtering material thrown away. The parts may then be replaced in the manner already explained.

If it is desired to remove the solvent from the container, the cock 18 can be opened, and the solvent will flow out without taking with it the dirt and muck accumulated in the filtering material.

Provision is made for affording a vent for any air that may collect in the filter.

The top 20 can be removed and the valve 52 opened and air can flow out through the holes 56 and the upper part of the tubular post 30.

Changes may be made in the details of the construction and arrangement of parts of my improved liquid filter without departing from the real spirit and purpose of my invention, and it is my intention to cover by my claims any modified forms of structure or use of mechanical equivalents, which may be reasonably included within their scope.

I claim as my invention:

1. In a filter of the kind described, a tubular container having a bottom, a lower, foraminous filter holder supported above the bottom, having a central, upwardly extending post, a body of filtering material on the lower holder, spaced foraminous filter holders above such body, a second body of filtering material above said spaced holders, an upper foraminous filter holder above the second body, an inlet pipe for supplying material to be filtered to the space between said spaced filter holders, outlets emerging from the container respectively below and above the lower and upper filter holders, and means for imposing pressure on the upper filter holder, said spaced filter holders having between them radially extending partition walls secured to them and terminating short of the peripheries and central portions of the spaced filter holders.

2. In a filter of the kind described, a tubular container having a bottom, a lower, foraminous filter holder supported above the bottom, having a central, upwardly extending post, a body of filtering material on the lower holder, spaced foraminous filter holders above such body, a second body of filtering material above said spaced holders, an upper foraminous filter holder above the second body, an inlet pipe for supplying material to be filtered to the space between said spaced filter holders, outlets emerging from the container respectively below and above the lower and upper filter holders, and means for imposing pressure on the upper filter holder, said spaced filter holders having between them radially extending partition walls secured to them and terminating short of the peripheries and central portions of the spaced filter holders, and an annular foraminous band between the spaced filter holders, spaced outwardly from said partition members.

3. In a filter of the kind described, a tubular container having a bottom, a lower, foraminous filter holder supported above the bottom, having a central, upwardly extending post, a body of filtering material on the lower holder, spaced foraminous filter holders above such body, a second body of filtering material above said spaced holders, an upper foraminous filter holder above the second body, an inlet pipe for supplying material to be filtered to the space between said spaced filter holders, outlets emerging from the container respectively below and above the lower and upper filter holders, and means for imposing pressure on the upper filter holder, said spaced filter holders having between them radially extending partition walls secured to them and terminating short of the peripheries and central portions of the spaced filter holders, and an annular foraminous band between the spaced filter holders, spaced outwardly from said partition members, the bottom of said container being in the form of a hollow cone and having a control cock at its lowermost portion.

4. In a filter of the kind described, a tubular container having a bottom, a lower foraminous filter holder supported above the bottom, having a central, upwardly extending hollow post, a body of filtering material on the lower holder, spaced foraminous filter holders above such body, a second body of filtering material above said spaced holders, an upper foraminous filter holder above the second body, an inlet pipe for supplying material to be filtered to the space between said spaced filter holders, outlets emerging from the container respectively below and above the lower and upper filter holders, and means for imposing pressure on the upper filter holder, a vent cock at the upper end of the post above the upper filter holder, said post having means affording communication between its interior and the space between the spaced filter holders above the lower body of filter material.

5. In a filter of the kind described, a container having a bottom, a lower, foraminous filter holder detachably supported above the bottom, having a central upwardly extending post, a body of filtering material on the lower holder, spaced foraminous filter holders above such body freely slidable on the post, means for holding said last holders above the second body of filtering material and freely slidable on the post, an inlet pipe for supplying material to be filtered to the space between said spaced filter holders, outlets emerging from the container respectively below and above the lower and upper filter holders, and means on the post for imposing pressure on the upper filter holder whereby both bodies of filtering material may be compressed, the filter holders and post forming a unit which may be readily removed as such from the container together with the filter material and may be installed part by part.

6. In a filter of the kind described, a container having a bottom, a lower, foraminous filter holder detachably supported above the bottom, having a central upwardly extending post, a body of filtering material on the lower holder, spaced foraminous filter holders above such body freely slidable on the post, means for holding said last holders against movement toward each other, a second body of filtering material above said spaced holders, an upper foraminous filter holder above the second body of filtering material and freely slidable on the post, an inlet pipe for supplying material to be filtered to the space between said spaced filter holders, outlets emerging from the container respectively below and above the lower and upper filter holders, the filter holders and post forming a unit which may be readily removed as such from the container, together with the filter material and may be installed part by part.

7. In a filter of the kind described, a tubular container having a bottom, a lower, foraminous filter holder supported above the bottom, having a central upwardly extending post, a body of filtering material on the lower holder, spaced foraminous filter holders above such body on the post, means for holding said last holders against movement toward each other, a second body of filtering material above said spaced holders, an upper foraminous filter holder above the second body and on the post, said spaced and upper filter holders being freely slidable on the post and with relation to each other, and means for imposing pressure on the upper filter holder whereby both bodies of filtering material may be compressed.

8. In a filter, a container having a portion adapted to receive filtering material and a portion adapted to receive material to be filtered, a foraminous member interposed between said portions, said second portion having an inlet for material to be filtered and spaced therefrom having means for distributing the material to be filtered around such portion, comprising a foraminous wall spaced from the inner face of the wall of the container.

Des Moines, Iowa, August 30, 1929.

EDGAR A. OHLSON.